US010061082B1

(12) United States Patent
Peng et al.

(10) Patent No.: US 10,061,082 B1
(45) Date of Patent: Aug. 28, 2018

(54) SPLITTER WAVEGUIDE USED TO PERFORM ACTIVE ALIGNMENT OF LIGHT SOURCE ON SLIDER

(71) Applicant: Seagate Technology LLC, Cupertino, CA (US)

(72) Inventors: Chubing Peng, Eden Prairie, MN (US); Michael Allen Seigler, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/638,810

(22) Filed: Jun. 30, 2017

Related U.S. Application Data

(60) Provisional application No. 62/375,971, filed on Aug. 17, 2016.

(51) Int. Cl.

| G11B 11/00 | (2006.01) |
|---|---|
| G02B 6/28 | (2006.01) |
| G02B 6/38 | (2006.01) |
| G11B 7/1387 | (2012.01) |
| H01S 3/063 | (2006.01) |
| G02B 6/36 | (2006.01) |
| G11B 11/105 | (2006.01) |
| G11B 5/60 | (2006.01) |
| G11B 5/00 | (2006.01) |

(52) U.S. Cl.
CPC ......... *G02B 6/2817* (2013.01); *G02B 6/3632* (2013.01); *G02B 6/3825* (2013.01); *G11B 5/6088* (2013.01); *G11B 7/1387* (2013.01); *G11B 11/10534* (2013.01); *H01S 3/063* (2013.01); *G11B 2005/0021* (2013.01)

(58) Field of Classification Search
None
See application file for complete search history.

(56) References Cited

U.S. PATENT DOCUMENTS

| 8,024,748 | B1 | 9/2011 | Moravec et al. | |
|---|---|---|---|---|
| 8,393,074 | B1 | 3/2013 | Takayama et al. | |
| 8,670,295 | B1 * | 3/2014 | Hu | G11B 5/105 369/13.13 |
| 8,787,129 | B1 | 7/2014 | Jin et al. | |
| 8,842,506 | B1 * | 9/2014 | Matsumoto | G11B 5/314 369/13.33 |
| 9,053,717 | B1 * | 6/2015 | Matsumoto | G11B 5/4866 369/13.33 |
| 9,070,386 | B2 | 6/2015 | Peng et al. | |
| 9,202,487 | B2 | 12/2015 | Peng | |

(Continued)

FOREIGN PATENT DOCUMENTS

EP 2355102 8/2011

OTHER PUBLICATIONS

U.S. Appl. No. 15/480,743, Peng et al., filed Apr. 6, 2017.

*Primary Examiner* — Tan X Dinh
(74) *Attorney, Agent, or Firm* — Hollingsworth Davis, LLC

(57) ABSTRACT

Light is directed from a light source at a coupling surface of a slider into a delivery waveguide of the slider. The delivery waveguide couples a first portion of the light into a near-field transducer at a media-facing surface. A second portion of the light is coupled into a splitter waveguide. The second portion of light is detected to perform an active alignment of the light source on the slider.

22 Claims, 8 Drawing Sheets

(56) References Cited

U.S. PATENT DOCUMENTS

| | | | |
|---|---|---|---|
| 9,245,553 B2* | 1/2016 | Boone, Jr. | G11B 5/4866 369/13.33 |
| 9,466,320 B1* | 10/2016 | Staffaroni | G11B 5/314 369/13.33 |
| 2006/0233061 A1 | 10/2006 | Rausch et al. | |
| 2007/0286031 A1 | 12/2007 | Matsumoto | |
| 2008/0204916 A1* | 8/2008 | Matsumoto | G11B 5/314 369/13.33 |
| 2009/0185459 A1* | 7/2009 | Matsumoto | G11B 5/4826 369/13.33 |
| 2009/0262608 A1 | 10/2009 | Karita et al. | |
| 2011/0122737 A1 | 5/2011 | Shimazawa et al. | |
| 2012/0092971 A1* | 4/2012 | Schreck | G11B 5/314 369/13.33 |
| 2012/0155232 A1* | 6/2012 | Schreck | G02B 6/1226 369/13.33 |
| 2013/0108212 A1 | 5/2013 | Peng et al. | |
| 2014/0254335 A1* | 9/2014 | Gage | G11B 5/6088 369/13.33 |
| 2014/0307533 A1* | 10/2014 | Peng | G11B 5/105 369/13.33 |
| 2015/0036137 A1 | 2/2015 | Peng et al. | |
| 2015/0279394 A1* | 10/2015 | Peng | G02B 6/14 369/13.33 |

* cited by examiner

US 10,061,082 B1

SPLITTER WAVEGUIDE USED TO PERFORM ACTIVE ALIGNMENT OF LIGHT SOURCE ON SLIDER

RELATED PATENT DOCUMENTS

This application claims the benefit of Provisional Patent Application No. 62/375,971 filed on Aug. 17, 2016, which is incorporated herein by reference in its entirety.

SUMMARY

The present disclosure is directed to a splitter waveguide used to perform active alignment if a light source on a slider. In one embodiment, light is directed from a light source at a coupling surface of a slider into a delivery waveguide of the slider. The delivery waveguide couples a first portion of the light into a near-field transducer at a media-facing surface. A second portion of the light is coupled into a splitter waveguide. The splitter waveguide is separated from the delivery waveguide via a gap and is integrated into the slider between the coupling surface and the media-facing surface. Via the splitter waveguide, the second portion of light is directed out of the media-facing surface and away from the near-field transducer such that stray light is rejected from the second portion of light. The second portion of light is detected to perform an active alignment of the light source on the slider.

In another embodiment, light is directed from a light source at a coupling surface of a slider into a delivery waveguide of the slider. The delivery waveguide couples a first portion of the light into a near-field transducer at a media-facing surface. A second portion of the light is coupled into a splitter waveguide. The splitter waveguide is separated from the delivery waveguide via a gap. The splitter waveguide is integrated into the slider between the coupling surface and the media-facing surface. A polarization rotation of the second portion of light is performed, and the second portion of light is polarization-filtered. The polarization-filtered portion of light is detected to perform an active alignment of the light source on the slider.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
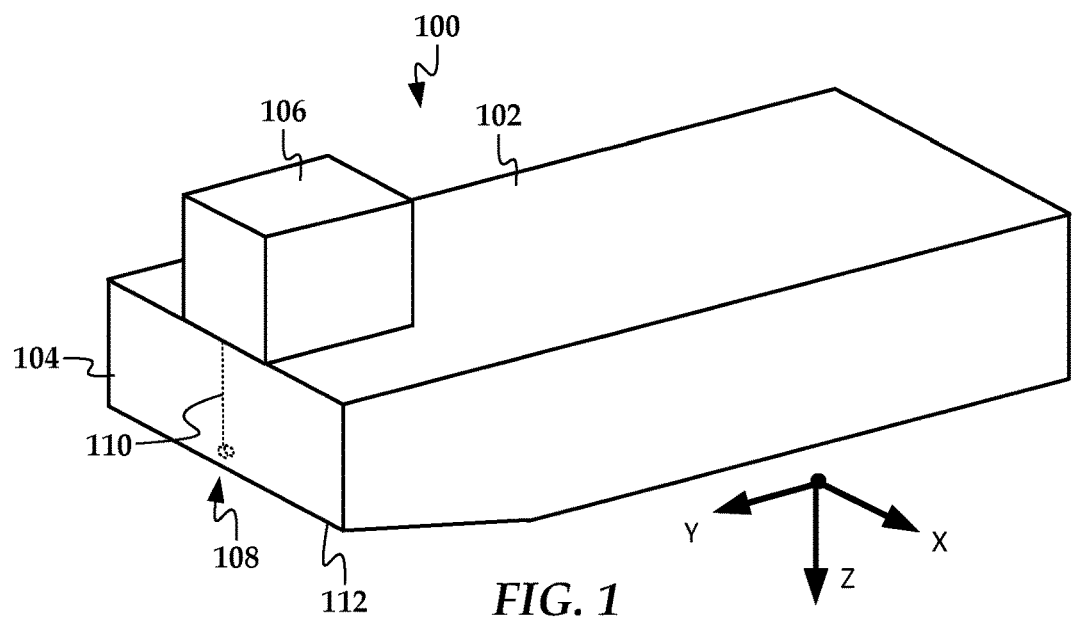
FIG. 1 is a perspective view of a slider assembly according to an example embodiment.

The present disclosure generally relates to data storage devices that utilize magnetic storage media, e.g., disks. Data storage devices described herein use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

Heat assisted magnetic recording (HAMR) uses a near-field transducer to concentrate optical energy into a tiny optical spot in a recording layer, which raises the media temperature locally, reducing the writing magnetic field required for high-density recording. A waveguide delivers light to the near-field transducer and excites the near-field transducer. Light from a light source, such as an edge-emitting laser diode, is coupled into the waveguide through waveguide input coupler or a spot size converter. In current configurations, the laser diode is mounted on a magnetic slider in such a way that a transverse electric (TE) polarized light source excites a TE waveguide mode in the slider waveguide while a transverse magnetic (TM) polarized light source excites a TM waveguide mode. The near-field transducer is designed to adapt the light delivery.

To ensure efficient light delivery, a light source should be accurately aligned with an input coupler at a mounting surface of the read/write head. Due to the small beam size from a light diode, active alignment may be used. Active alignment involves using a photodetector to generate an electric signal responsive to light detected from the read/write head. This electrical signal is used as feedback to guide the laser diode-slider assembly process. One such feedback signal can be derived from the light transmitted through the slider along the waveguide and into the near-field transducer. However, the actual transmitted light contains stray light that is not coupled into and does not propagate along the waveguide as a waveguide mode. The stray light could be around the main waveguide, for instance, in a 20 µm radius if using a straight-light path. If an offset light path is used, most of stray light may be at the air-bearing surface at a location corresponding to the position to the light source, which is offset from the location of the near-field transducer. This amount of stray light could be significant, e.g., over 50%, because the gap between laser diode front facet and the slider input surface is intentionally set to be high during the active assembly process to avoid any contact between the diode submount and the slider. This stray light prevents the correct positioning of the light source onto the waveguide input coupler.

To eliminate issues resulting from stray light, a cross-polarization scheme can be used for active alignment. In this scheme, light that is polarized orthogonal to the illumination (called cross-polarization) is used as a feedback signal instead of the total transmitted light through the primary delivery waveguide. The cross-polarization component is induced by the near-field transducer. The strength of the cross-polarization component is therefore more indicative of laser-to-slider alignment that affects near-field transducer performance than is the strength of total transmitted light.

To improve the thermal gradient for writing sharp magnetic transitions, current near-field transducers may use an optical shield or gap-plasmon aperture. In these cases, the amount of cross-polarization is significantly reduced, for instance, by two orders, but the amount of stray light stays more or less the same. The amount of cross-polarization can be so low that the signal-to-noise ratio is too low for the assembly process. In addition to stray light, other sources of noise that affects this low signal-to-noise ratio includes thermal noise in the amplifier of the photo-diode circuits and shot noise from the discrete nature of photons.

In some embodiments described below, a splitter is proposed that outputs an increased amount of cross polarization to assist the assembly. The splitter couples a small amount of light, for instance, 10%, from the light delivery waveguide and outputs a significant amount of cross-polarization away from the near-field transducer. In this way, the benefits of an optical shield or gap-plasmon aperture can be retained, while still being able to effectively perform active alignment in HAMR head assembly.

In reference now to FIG. 1, a perspective view shows a read/write head 100 according to an example embodiment. The read/write head 100 may be used in a magnetic data storage device, e.g., HAMR hard disk drive. The read/write head 102 may also be referred to herein interchangeably as a slider, write head, read head, recording head, etc. The read/write head 100 has a slider body 102 with read/write transducers at a trailing edge 104 that are held proximate to a surface of a magnetic recording medium (not shown), e.g., a magnetic disk.

The illustrated read/write head 100 is configured as a HAMR device, and so includes additional components that form a hot spot on the recording medium near the read/write transducer 108. These components include an energy source 106 (e.g., laser diode) and a waveguide 110. The waveguide 110 delivers electromagnetic energy from the energy source 106 to a near-field transducer that is part of the read/write transducers 108. The near-field transducer achieves surface plasmon resonance in response and directs the energy out of a media-facing surface 112 to create a small hot spot on the recording medium. These components are shown in greater detail in FIG. 2, which is a block diagram illustrating a cross-sectional view of the slider body 102 according to an example embodiment.

Figure 2:
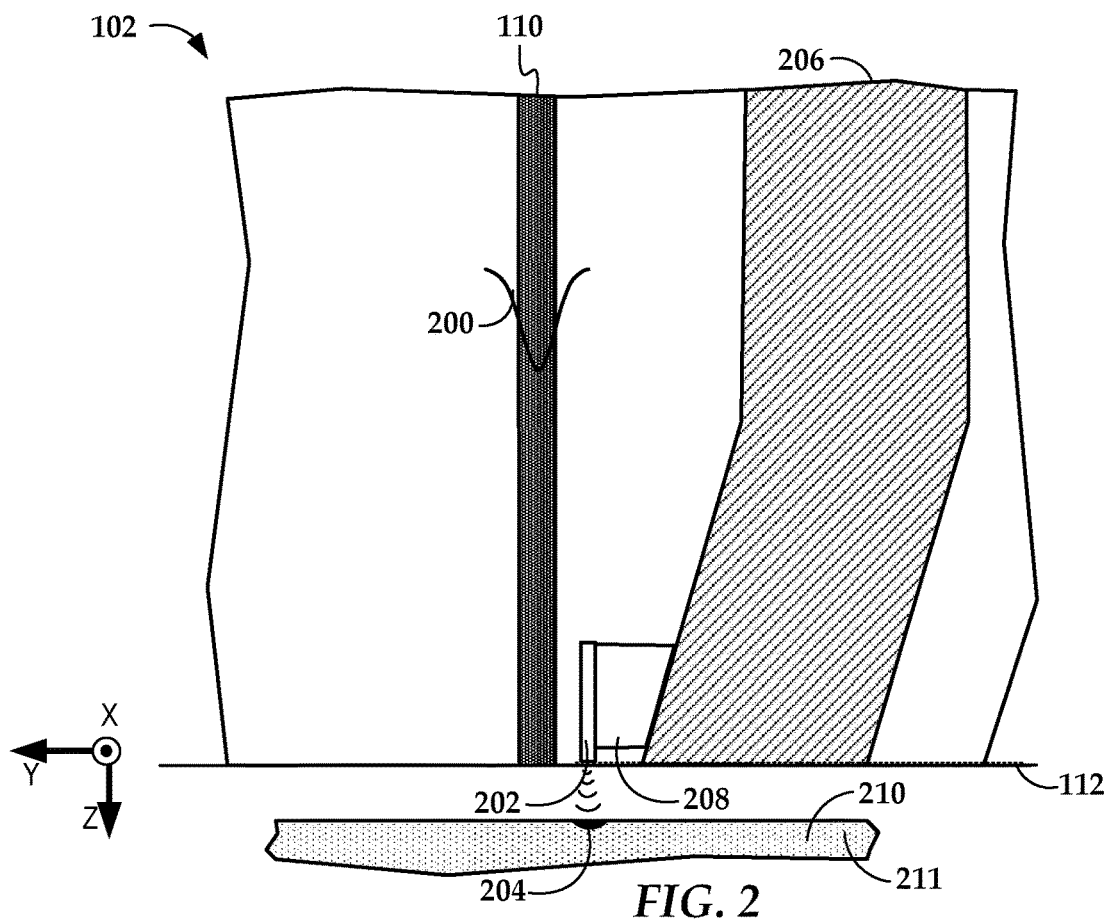
FIG. 2 is a cross-sectional view of a slider according to an example embodiment.

As shown in FIG. 2, the waveguide 110 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on a surface 210 of a recording medium 211. A magnetic write pole 206 causes changes in magnetic flux near the media-facing surface 112 in response to an applied current. Flux from the write pole 206 changes a magnetic orientation of the hotspot 204 as it moves past the write pole 206 in the downtrack direction (y-direction).

Figure 3:
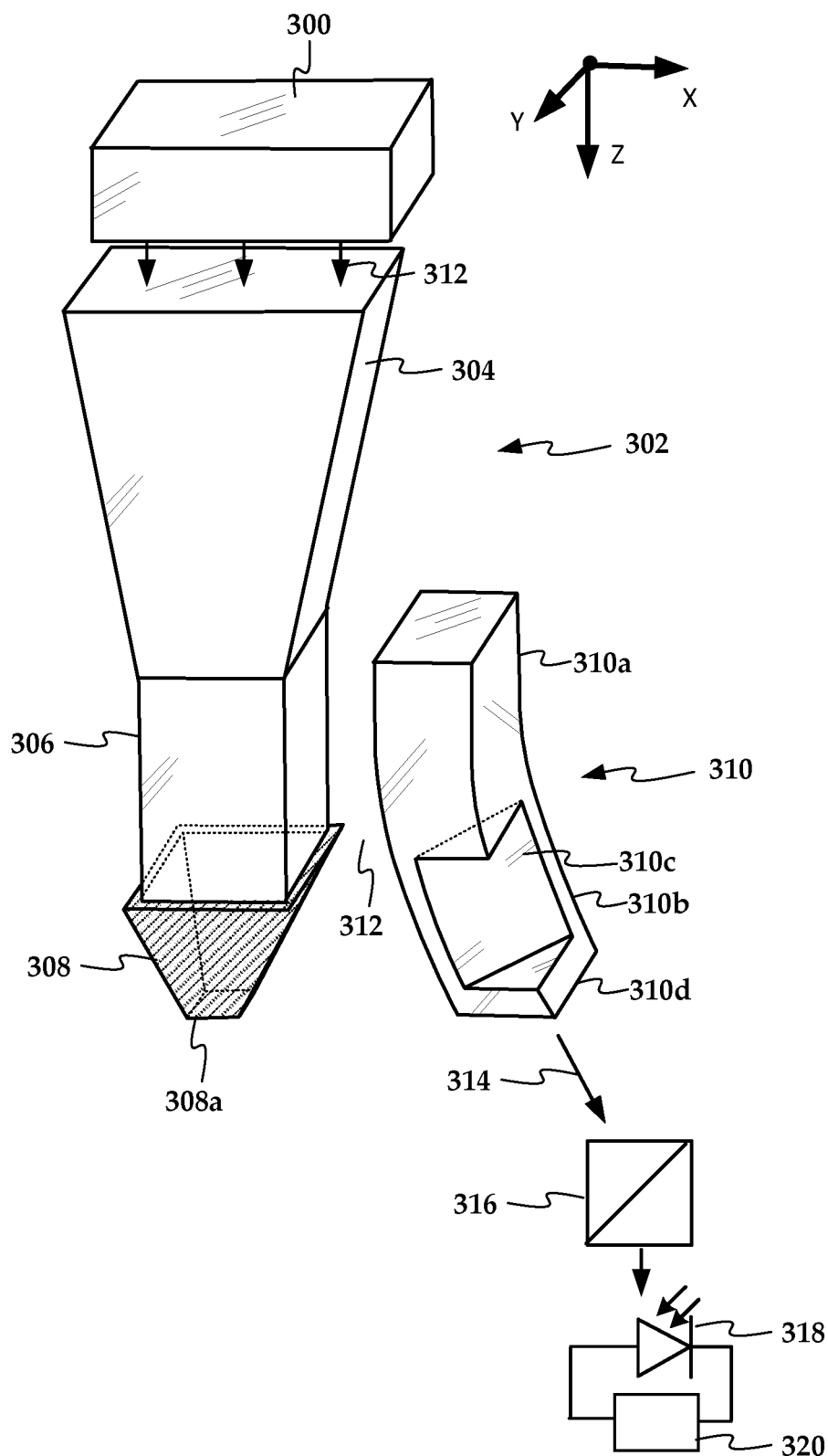
FIG. 3 is a perspective view of a splitter waveguide and delivery waveguide according to an example embodiment.

This disclosure considers three potential configurations for light delivery in a HAMR recording head. A light delivery configuration according to a first example embodiment is shown in FIG. 3. A light source 300 directs light into a waveguide input coupler 304, which is part of a light delivery waveguide 302. The light source 300 may be an edge-emitting or surface-emitting laser diode. The input coupler 304 tapers from a larger dimension (e.g., larger cross-sectional area normal to light propagation direction) near the light source 300 to a smaller dimension (e.g., smaller cross-sectional area to light propagation direction) near a straight waveguide section 306. In this example, the straight waveguide section 306 couples a first portion of the light to an aperture NFT 308. The aperture NFT 308 is a gap-plasmon aperture formed by tapering the waveguide core to a small dimension, and surrounded the core with a plasmonic metal, such as Au, Ag, Cu, Rh, Pt, Ir, etc. A distal end 308a of the tapered aperture 308 is at or near a media-facing surface of the recording head.

A splitter waveguide 310 is separated from the delivery waveguide 302 by a gap 312. The gap 312 may be filled by a dielectric material. The splitter waveguide 310 includes a coupling sector 310a that couples a second portion of the light from the delivery waveguide 302 by directional coupling. A polarization rotator 310b causes a cross-polarization of the second portion of light. In this example, the polarization rotator 310b includes an angled face 310c that cuts across two sides of the rectangular waveguide core.

The light beam 312 exiting from the light source 300 is substantially linearly polarized. A fundamental waveguide mode, e.g., transverse electric ($TE_{00}$) or transverse magnetic ($TM_{00}$), is excited by the light source 300 and then propagates all the way to a NFT 308. There is no polarization rotator or mode order converter involved in the light path defined by the delivery waveguide 302.

The excited waveguide mode in the splitter waveguide 310 will also be a $TE_{00}$ ($TM_{00}$) if the light delivery mode is $TE_{00}$ ($TM_{00}$). The polarization rotator 310b converts the excited $TE_{00}$ ($TM_{00}$) to a $TM_{00}$ ($TE_{00}$) mode, with an acceptable level of conversion. The polarization rotator 310b bends away from the delivery waveguide 302, such that the second portion of light 314 in the rotated mode exits the media-facing surface of the slider away from the NFT 308. The transmitted light 314 exiting from the slider will be filtered by a polarization element 316, which passes only those light polarized orthogonal to that of the light source to a photodiode 318. The electric output from the photodiode 318 is used by a controller 320 to assist the assembly between the light source and the slider waveguide input coupler. In other embodiments, one or more of the polarization element 316 and photodiode 318 may be integrated into the slider.

Figure 4:
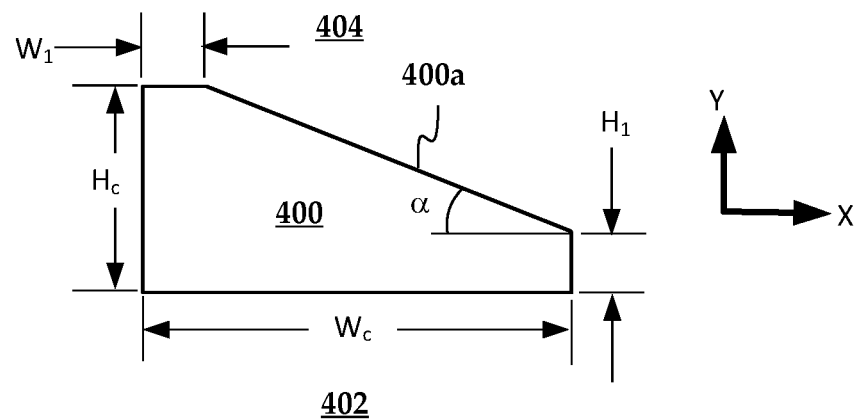
FIGS. 4 and 5 are cross-sectional views showing details of polarization rotators according to example embodiments.
Figure 5:
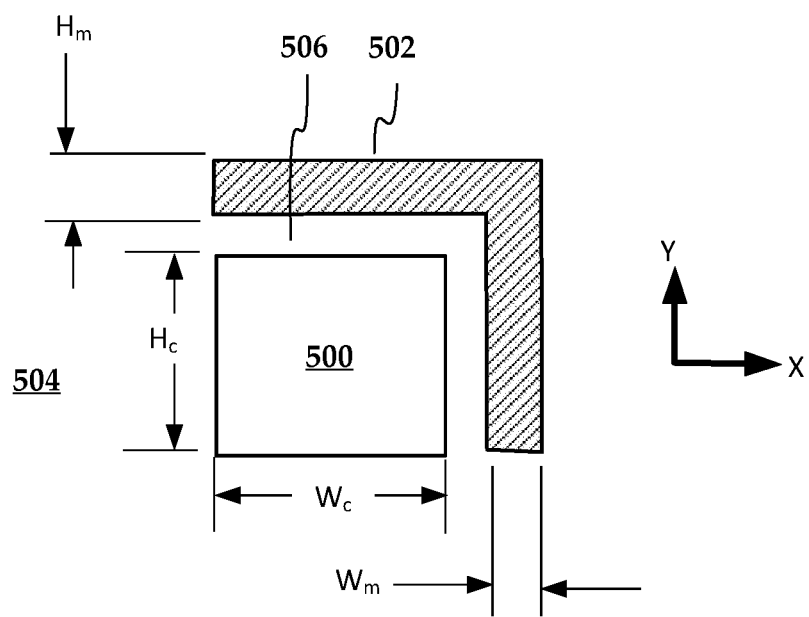

There are a number of structures that can be used to achieve polarization rotation, as shown in the cross-sectional views of FIGS. 4 and 5. For the purpose of assembly, the polarization rotator could have relative narrow operation bandwidth and tolerances in the geometry, but it is preferred to be easily fabricated and to be short to fit into a magnetic slider, e.g., some sliders are only 180 μm high. The illustrated slanted sidewall 310c in FIG. 3 is just one example of an asymmetric waveguide, and is also shown in FIG. 4. In FIG. 4, a core 400 with a slanted sidewall 400a is surrounded by cladding 402, 404. The asymmetric waveguide core 400 has two eigen modes, propagating at different phase velocities. With a careful design, their optical axes are at 45° rotated from a TE or TM mode. Inside the polarization rotator, the two eigen modes are excited and recombined to a mode at the end connecting with an output waveguide with the polarization orthogonal to that of the input after half of the beat length.

A plasmonic hybrid waveguide could also achieve polarization rotation in a short length, as shown in FIG. 5. A plasmonic metal 502 is deposited at the top and on one sidewall of the waveguide core 500 to form an asymmetric waveguide. It is separated from the core with a thin (for instance, 50 nm thick) dielectric material 506 of low index of refraction. The dielectric, gap-filling material 506 could be the same as the cladding 504 that surrounds the other surfaces of the core. This approach may not be preferred in some cases, as absorption in the plasmonic metal 502 induces local protrusion.

Figure 6:
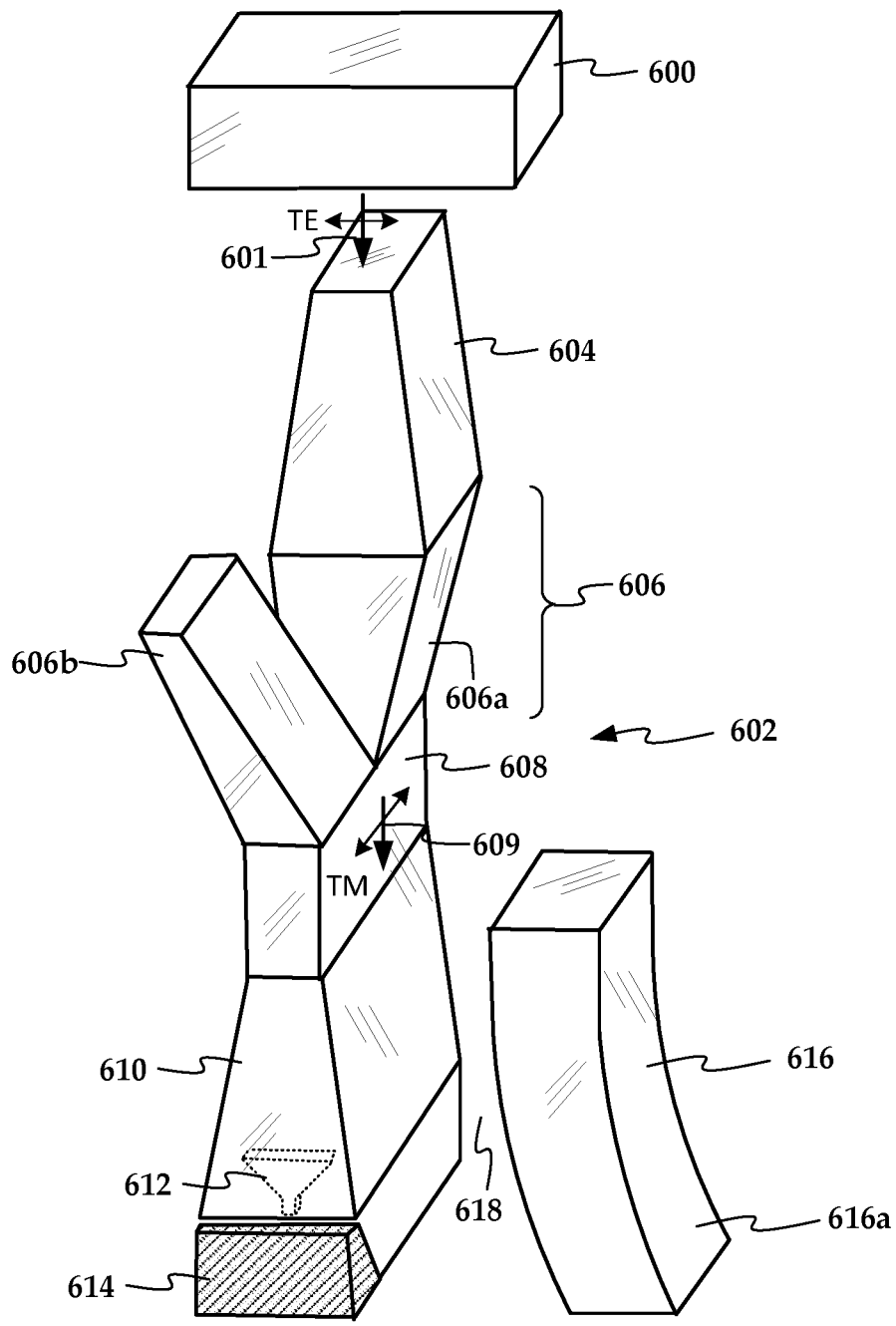
FIGS. 6 and 7 perspective views of a splitter and delivery waveguides according to other example embodiments.

In FIG. 6, a perspective view shows an alternative embodiment that uses an asymmetric waveguide for polarization rotation, where the asymmetry varies gradually along the propagation direction. This embodiment has low insertion loss and allows large operation bandwidth and tolerances in geometry. A light source 600 directs light into a waveguide input coupler 604, which is part of a light delivery waveguide 602. The input coupler 604 tapers from a smaller dimension (e.g., smaller cross-sectional area normal to light propagation direction) near the light source 600 to a larger dimension (e.g., larger cross-sectional area normal to light propagation direction) away from the light source 600.

The input coupler 604 couples light to a polarization rotator 606 integrated in the light delivery path. The polarization rotator 606 includes a main portion 606a extending from the input coupler 604 and a branch waveguide 606b. The excited waveguide mode from the light source 600 is a TE or TM mode (TE mode input light 601 is shown in this illustration). The coupled portion light is then rotated by the polarization rotator to output a TM or TE mode (TM mode rotated light 609 is shown in this illustration). The rotated light 609 is coupled via a waveguide taper 610 to excite a near-field transducer 612.

The near-field transducer 612 has a triangular or elliptic plasmonic plate with a peg for light delivery, which is one of the optimal shapes for light delivery with a TM mode. An optical shield 614 blocks the excitation light that resides in the waveguide to improve the thermal gradient for writing sharp magnetic transitions. A splitter waveguide 616 is separated from the delivery waveguide by a gap 618, and is designed to couple the waveguide mode polarized orthogonal to that of the light source after the rotator 606, e.g., TM mode in the illustrated example. No additional polarization rotator is used in the splitter waveguide 616. While not shown, a polarization element and photodiode can be used to detect light from the splitter waveguide 616, similar to the arrangement shown in FIG. 3.

Sometimes, for increasing the separation of the splitter waveguide from light delivery at the output side, the splitter is placed prior to the polarization rotator, which allows more space for bending the splitter. In such circumstance, a polarization rotator can be used on the splitter waveguide (e.g., as shown in FIGS. 3-5) to output a cross-polarization component from the splitter waveguide. Such an arrangement can be used if there is not enough space for the splitter waveguide to separate from the light delivery waveguide if the splitter is placed after the polarization rotator in the light delivery waveguide.

Figure 7:
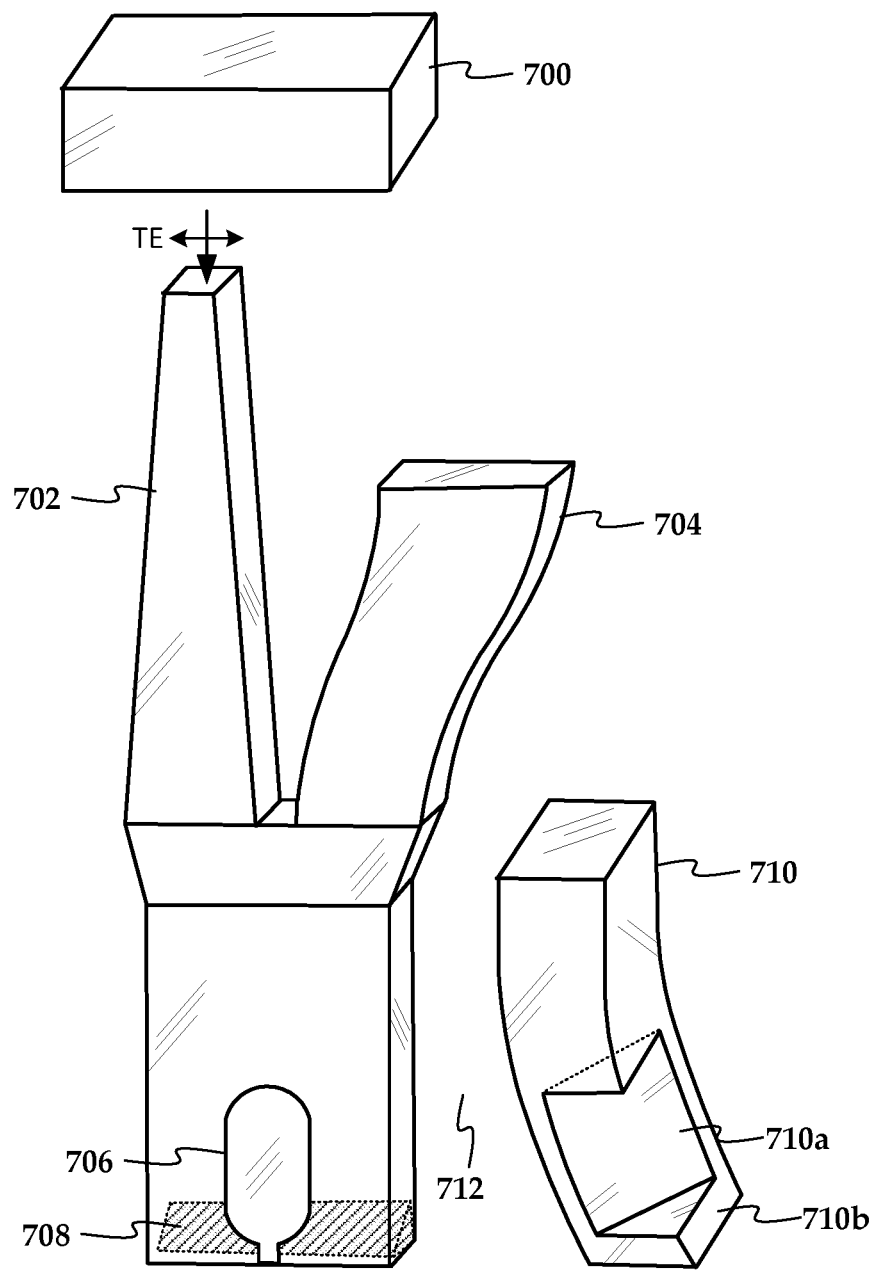

In FIG. 7, a perspective view shows a third configuration of light delivery according to an example embodiment. A light source 700 couples light into a tapered input coupler 702 which tapers from a smaller dimension near the light source to a larger dimension. For HAMR application, this configuration often uses a TE mode. As seen in FIG. 7, the light source 700 excites a fundamental TE mode, $TE_{00}$, propagating in the light delivery waveguide near the input coupler 702.

A mode-order converter is integrated in the light delivery path shown in FIG. 7. In this example, the mode-order converter uses a branch waveguide 704. The light is converted into a higher-order mode, $TE_{10}$, by a $TE_{00}$-to-$TE_{10}$, to excite NFT 706. Alternative converters may use a directional coupler or a multimode interference (MMI) coupler.

The NFT 706 includes a rounded (e.g., circular, stadium-shaped) resonator with a peg, one or both including plasmonic materials. An optical shield 708 blocks the excitation light that resides in the waveguide to avoid background heating in the media in order to improve thermal gradient. A splitter 710 is located near the delivery waveguide, separated by a gap 712. The splitter 710 may be designed in a number of different ways. In a first embodiment, the splitter 710 couples with the light delivery waveguide before the mode-order converter 704. A polarization rotator 710a is integrated in the splitter waveguide 710 to output a component with polarization orthogonal to that of the light source.

In a second embodiment, the splitter 710 is configured to couple with the light delivery waveguide after the mode order converter 704. The splitter waveguide 710 in such a case is designed to achieve $TE_{00}$-$TE_{10}$ mode coupling. The excited mode in the splitter is a fundamental mode, $TE_{00}$. As with the first embodiment, a $TE_{00}$-to-$TM_{00}$ polarization rotator 710a is integrated in the splitter waveguide 710 to output a $TM_{00}$ mode. In a third embodiment, the splitter waveguide is after the mode-order converter similar to the second embodiment, except that the coupling is with higher-order modes $TE_{10}$-$TM_{10}$. The excited mode in the splitter waveguide 710 in this second embodiment is $TE_{10}$.

Figure 8:
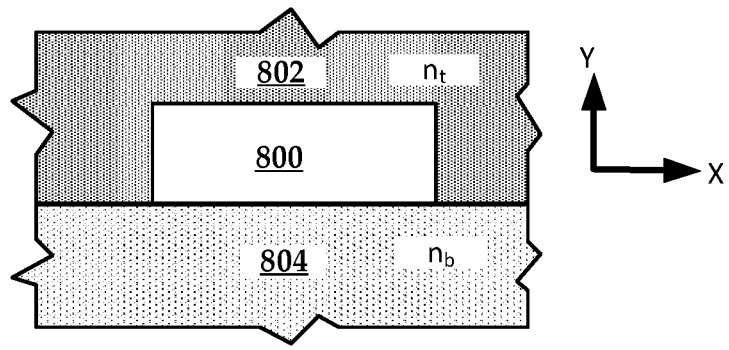
FIGS. 8-10 are cross-sectional views showing details of polarization rotators according to other example embodiments.
Figure 9:
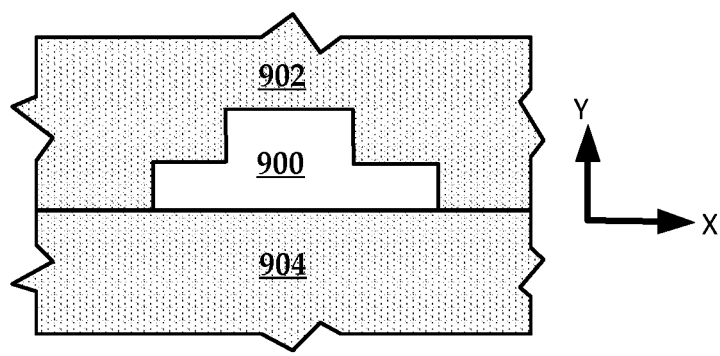
Figure 10:
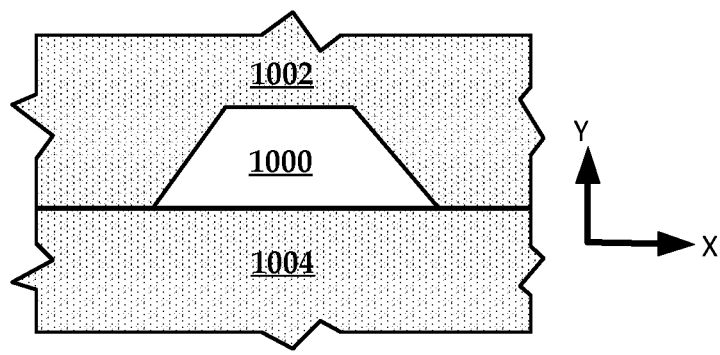

The polarization rotator 710a integrated in some embodiments of the splitter waveguide 710 is intended to achieve a first-order to rotated, fundamental mode (e.g., $TE_{10}$-$TM_{00}$) conversion. The design of a $TE_{10}$-$TM_{00}$ rotator is different from that of a fundamental-to-rotated-fundamental (e.g., $TE_{00}$-$TM_{00}$) rotator. This may involve creating a mirror asymmetry to hybridize the $TE_{10}$ and $TM_{00}$ mode. The cross-sectional views in FIGS. 8-10 show some example embodiments of $TE_{10}$-$TM_{00}$ rotator in a splitter waveguide. In FIG. 8, a core 800 of the splitter waveguide is surrounded by a top cladding layer 802 and a bottom cladding layer 804. The top cladding 802 has different index of refraction ($n_t$) from the bottom cladding 804 ($n_b$). In FIG. 9, a waveguide core 900 has a rib shape and is also surrounded by top and bottom cladding layers 902, 904 which may have the same or different indices of refraction. In FIG. 10, a core 1000 has a trapezoidal cross-section with slanted sidewalls. The core 1000 is surrounded by top and bottom cladding layers 1002, 1004 which may have the same or different indices of refraction.

While embodiments above describe using a polarization rotator as part of a splitter waveguide, there may be alternative ways to prevent stray light from entering the photodiode without cross-polarization in the splitter. For example, if the channel waveguide that delivers light to the NFT can be extended far enough to the side (e.g., crosstrack offset relative to the NFT), the output from a splitter could be separated from the stray light, e.g., spatial separation. For purposes of this disclosure, a splitter that provides spatial separation may be considered as a stray light blocking structure, as the waveguide properties (e.g., length, distance from delivery waveguide) and properties of the surrounding materials prevent stray light from propagating towards the photodetector.

Figure 13:
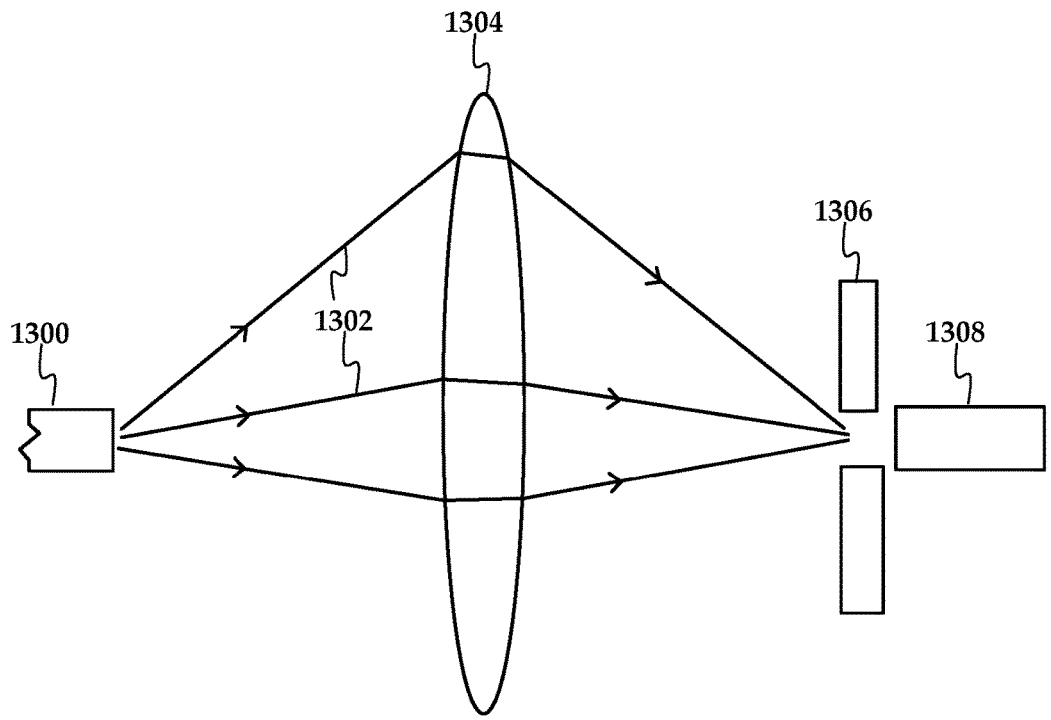
FIG. 13 is a block diagram of an angular separation light detection scheme according to an example embodiment.

For a spatial separation splitter waveguide, the total transmitted light around the splitter could be collected without cross-polarization, using a confocal detection scheme implemented with an iris to block all other light (see discussion of FIG. 13 below). The splitter waveguide output face (the distal end) is far away from the light delivery waveguide. The stray light is more or less centered around the light delivery waveguide. As such, if the splitter waveguide is far away from the light delivery waveguide, the amount of stray light around the splitter waveguide output will be minimal. So the output from the splitter waveguide, even though it has the same polarization as the light source, may be used for feedback signal, since it is not spoiled by the stray light.

In another embodiment, the delivery waveguide can be configured to diverge/propagate the transmitted light at a specific angle, e.g., angular separation. An example of angular separation is shown in the block diagram of FIG. 13. A splitter 1300 could be located at an angle to separate it from most of the background light around the delivery waveguide, similar to dark-field detection in microscopy. This approach may be difficult to operate in practice, requiring precise alignment between the collection optics and the splitter. The output 1302 from the splitter waveguide 1300 propagates along a direction that is substantially different from that of the stray light and collected via optical component such as collection lens 1304. All light may be blocked (e.g., via iris 1306), except for the narrow angular ranges that correspond to the output of the splitter 1300. The light at this narrow angular range is detected via a photodetector 1308. As noted above, the arrangement shown in FIG. 13 may also be used with a spatial separation arrangement, such that the iris 1306 and/or splitter 1300 need not be fabricated with precise angular ranges.

One issue that may arise with a splitter waveguide is that it may cause light to be reflected (e.g., from the recording medium) back to the light source. This reflected light may de-stabilize the light source, for instance, causing longitudinal mode hopping in a laser diode. This mode hopping can lead to a light source output jump and therefore, transition shift in the bits written to the recording medium. For example, if the light split from the delivery waveguide is 5%, and assuming 100% reflection from the media and then 5% coupled back into the delivery waveguide, the return light will be 5%×5%=0.125%, which might be still high enough to affect laser stability. In the embodiments shown above, the splitter waveguides 310, 616, 710 are shown with output ends 310d, 616a, 710b tilted at an acute angle relative to the media-facing surface (and relative to the light propagation direction of the delivery waveguides). This tilting can reduce the amount of light returned to the light source.

In other embodiments, the output ends 310d, 616a, 710b of the splitter waveguides 310, 616, 710 can be instead or in addition recessed from the media-facing surface. This recess will be effective to reduce the return light while does not affect the optical alignments signal significantly. In other embodiments, the output ends 310d, 616a, 710b of the splitter waveguides 310, 616, 710 can instead or in addition have an output facet that is tilted relative to the media-facing surface.

Figure 11:
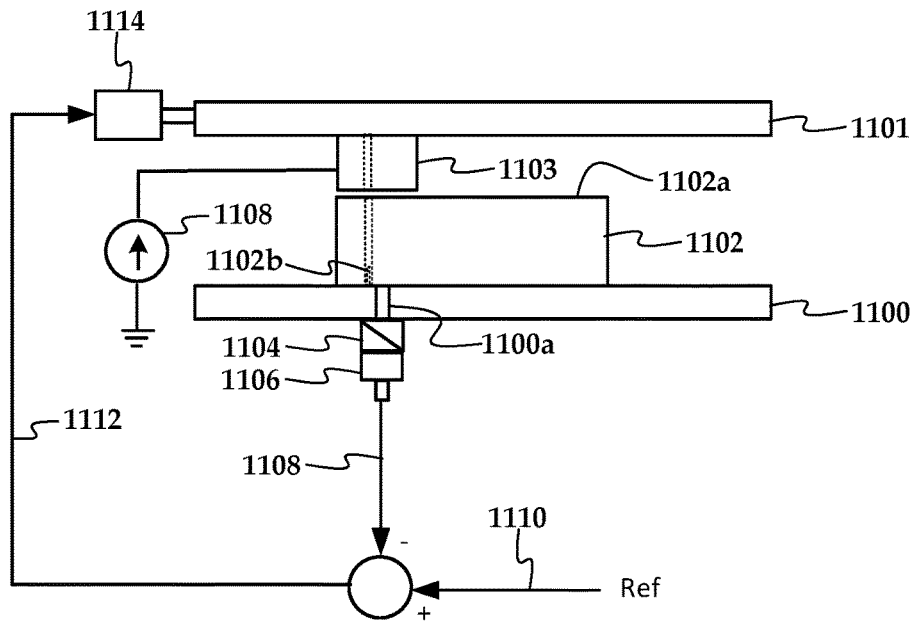
FIG. 11 is a diagram of a manufacturing process according to an example embodiment.

In FIG. 11, a block diagram shows a manufacturing system and apparatus according to an example embodiment. Fixtures 1100, 1101 are part of a fixture assembly and are configured to hold a respective slider 1102 and laser diode 1103 (or other energy source). At least one of the fixtures 1100, 1101 are controllably movable relative to the other, generally with at least three degrees of freedom. The fixtures 1100, 1101 are able to move normal to a mounting plane defined, e.g., by top coupling surface 1102a of the slider. This movement enables attaching the laser diode 1103 to the slider 1102. The fixtures 1100, 1101 are also able to move in orthogonal directions on the mounting plane to align the laser diode 1103 to the slider 1102 before attachment.

Before attachment of the laser diode 1103 to the slider 1102, a current source 1108 inputs a current to the laser diode 1103 causing it to emit light into the slider 1102. The slider 1102 is configured with a splitter waveguide as described herein, which causes a select portion of total light to be emitted away from an NFT 1102b integrated into the slider 1102. The lower fixture 1100 includes a light collector 1100a (e.g., lens, mirror, waveguide) that gathers light emitted from the splitter waveguide and couples the collected light to a polarization element 1104 (e.g., polarization filter) of the fixture assembly that rejects stray light. The polarization element 1104 couples a select component of the collected light to a photodiode 1106, which outputs an electrical signal 1108 in response.

The electrical signal 1108 is combined with a reference signal 1110 to create a feedback signal 1112. The feedback signal 1112 is a control signal input to one or more actuators 1114 that perform in-plane alignment between the laser 1103 and slider 1102. In this diagram, the actuator is shown moving the fixture 1101 that holds the laser 1103, but could be used instead or in addition to move the fixture 1100 holding the slider 1102. It will be understood that the illustrated system could be used to align multiple lasers and sliders simultaneously, and may be used with other alignment features, e.g., optically detected fiducial marks that provide rough positioning.

The alignment techniques illustrated in FIG. 11 could also be used with other components in addition to laser diodes, e.g., submounts, photodiodes, etc. In other embodiments, one or both of the polarization element 1104 and the photodiode 1106 may be integrated into the slider 1102, such that the electrical signal 1108 is obtained from a pad on the slider 1102. In other embodiments, a different stray light blocker could be used instead of or in addition to the polarization element. For example, a slider-integrated lens and iris could be used as shown in FIG. 13. In other examples, a slider-integrated splitter waveguide (e.g., similar to waveguide 616 in FIG. 6) with an output that is offset sufficiently from the delivery waveguide may be used as a light blocker that rejects the stray light.

Figure 12:
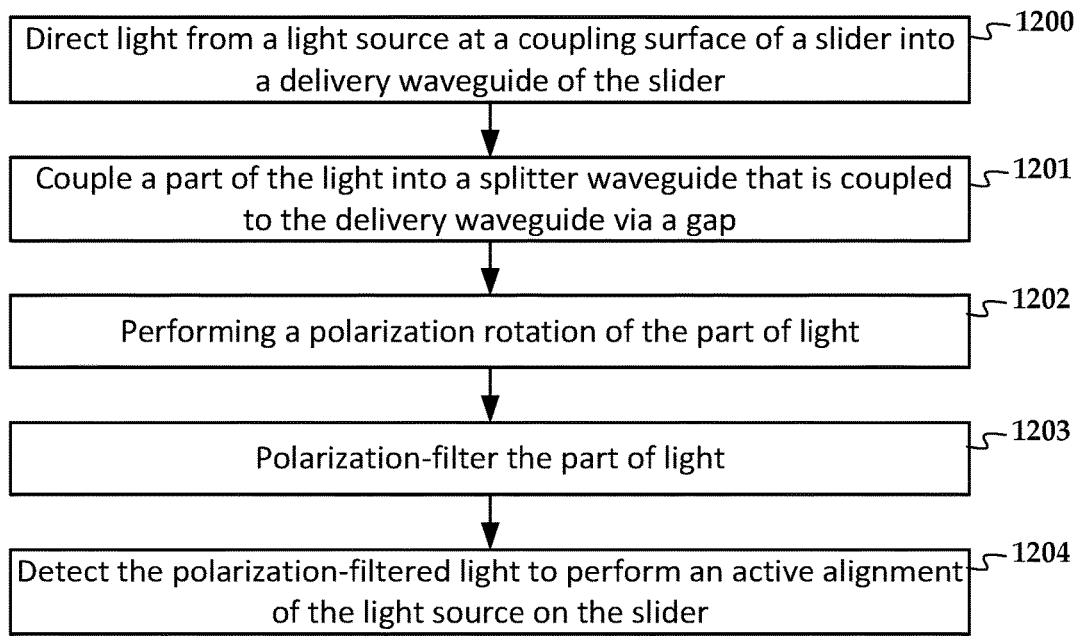
FIG. 12 is a flowchart of a method according to an example embodiment.

In FIG. 12, a flowchart shows a method according to an example embodiment. The method involves directing 1200 light from a light source at a coupling surface of a slider into a delivery waveguide of the slider. The delivery waveguide couples a first part of the light into a near-field transducer at a media-facing surface. A second part of the light is coupled 1201 into a splitter waveguide that is coupled to the delivery waveguide via a gap therebetween. The splitter waveguide is integrated into the slider between the coupling surface and the media-facing surface. A polarization rotation is performed 1202 on the second part of light. The second part of light is polarization-filtered. The polarization-filtered light is detected 1204 to perform an active alignment of the light source on the slider.

Figure 14:
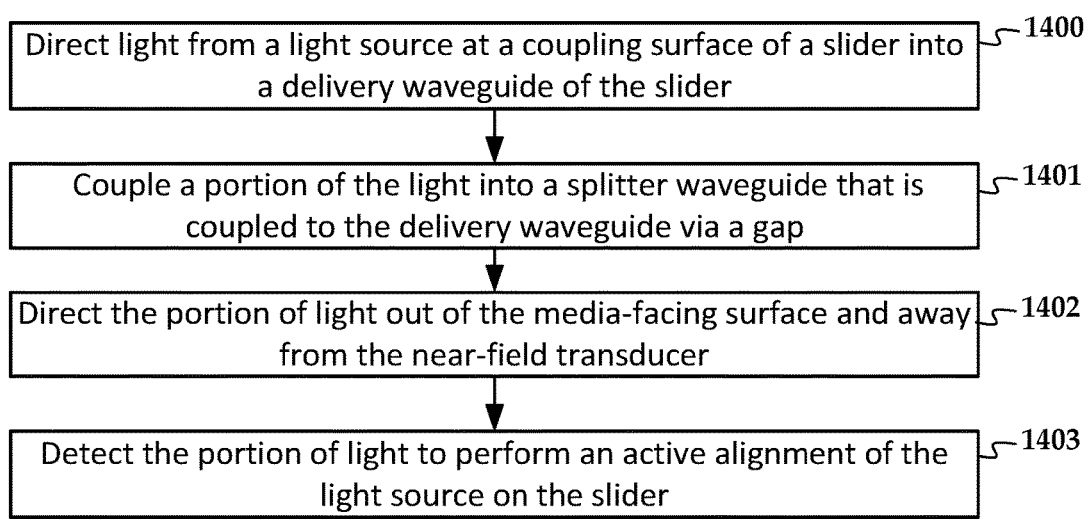
FIG. 14 is a flowchart of a method according to another example embodiment.

In FIG. 14, a flowchart shows a method according to another example embodiment. Light is directed 1400 from a light source at a coupling surface of a slider into a delivery waveguide of the slider. The delivery waveguide couples a first portion of the light into a near-field transducer at a media-facing surface. A second portion of the light is coupled 1401 into a splitter waveguide. The splitter waveguide is separated from the delivery waveguide via a gap and is integrated into the slider between the coupling surface and the media-facing surface. Via the splitter waveguide, the second portion of light is directed 1402 out of the media-facing surface and away from the near-field transducer such that stray light is rejected from the second portion of light. The second portion of light is detected 1403 to perform an active alignment of the light source on the slider.

In summary a side splitter waveguide is used to assist the assembly between a light source and waveguide. The side splitter waveguide couples a small portion of light from the light delivery waveguide and outputs a field component polarized orthogonal to that of the light source. The output from the splitter is filtered by a polarization element to allow only that light polarized orthogonal to the light source to reach a photodiode. Maximizing the electric output signal from the photo-diode aligns the light source onto the light delivery waveguide for efficient light delivery.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    directing light from a light source at a coupling surface of a slider into a delivery waveguide of the slider, the delivery waveguide coupling a first portion of the light into a near-field transducer at a media-facing surface;
    coupling a second portion of the light into a splitter waveguide, the splitter waveguide separated from the delivery waveguide via a gap, the splitter waveguide integrated into the slider between the coupling surface and the media-facing surface;
    directing, via the splitter waveguide, the second portion of light out of the media-facing surface and away from the near-field transducer; and
    detecting the second portion of light outside of the slider to perform an active alignment of the light source on the slider.

2. The method of claim 1, further comprising:
    performing a polarization rotation of the second portion of light via a polarization rotator of the splitter waveguide before the second portion of light exits the waveguide; and
    polarization-filtering the second portion of light after the polarization rotation to reject stray light.

3. The method of claim 2, wherein the second portion of light is polarization-rotated orthogonally to the light from the light source.

4. The method of claim 2, wherein the polarization rotation of the second portion of light is performed via the splitter waveguide.

5. The method of claim 2, wherein the polarization rotation of the second portion of light is performed via the delivery waveguide.

6. The method of claim 2, wherein the first and second portions of the light are converted by the delivery waveguide to a higher-order mode, the splitter waveguide achieving a conversion of the second portion to a fundamental mode before polarization rotation is performed on the second portion of the light.

7. The method of claim 2, wherein the second portion of the light is coupled to the splitter waveguide in a higher-order mode, the polarization rotation further comprising performing a conversion to a rotated, fundamental mode.

8. The method of claim 7, wherein the polarization rotation and the conversion to the fundamental mode comprises creating a mirror asymmetry to hybridize the higher-order mode and the rotated, fundamental mode.

9. The method of claim 1, wherein the first portion of the light is converted to a higher-order mode via a mode converter and the second portion of the light is coupled into the splitter waveguide in a fundamental mode before the mode converter.

10. The method of claim 1, wherein an output of the splitter waveguide is offset sufficiently from the delivery waveguide to reject stray light from the second portion of the light, and wherein the detection of the second portion of the light is performed without polarization rotation of the second portion of the light and without polarization-filtering of the second portion of light.

11. The method of claim 1, further comprising:
    performing a first polarization rotation of the first portion of light via the delivery waveguide, and wherein the second portion of the light is coupled into the splitter waveguide before the first polarization rotation; and
    performing a second polarization rotation of the second portion of light via the splitter waveguide, and wherein detecting the second portion of the light further comprises polarization-filtering the second portion of light.

12. A slider, comprising:
    a coupling surface;
    a delivery waveguide receiving light from a light source via the coupling surface in a first mode;
    a near-field transducer at a media-facing surface away from the coupling surface, the near-field transducer receiving a first portion of the light from the delivery waveguide;
    a splitter waveguide between the coupling surface and the media-facing surface and separated from the delivery waveguide via a gap, the splitter waveguide coupling a second portion of the light from the delivery waveguide; and
    a polarization rotator that converts the second portion of light from the first mode to a rotated mode, the splitter waveguide directing the second portion of the light in the rotated mode out of the media-facing surface and away from the near-field transducer, the second portion of the light exiting the media-facing surface being used to actively align the light source on the slider during assembly.

13. The slider of claim 12, wherein the polarization rotator comprises one of a slanted sidewall of the splitter waveguide or a plasmonic hybrid waveguide integrated into the splitter waveguide.

14. The slider of claim 12, wherein the delivery waveguide comprises the polarization rotator.

15. The slider of claim 12, wherein:
the delivery waveguide comprises a mode converter that converts the light from a fundamental mode to a higher-order mode; and
the second portion of the light is coupled from the delivery waveguide to the splitter waveguide in the fundamental mode before the mode converter.

16. The slider of claim 12, wherein:
the delivery waveguide comprises a mode converter that converts the light from a fundamental mode to a higher-order mode; and
the second portion of the light is coupled from the delivery waveguide to the splitter waveguide in the higher-order mode after the mode converter, the splitter waveguide achieving a conversion of the second portion to a rotated, fundamental mode.

17. The slider of claim 12, wherein an output end of the splitter waveguide is tilted at an acute angle relative to the media-facing surface, the tilted output end reducing an amount of the light exiting from the output end from being reflected from a recording medium back to the light source during operation of the slider.

18. The slider of claim 12, wherein an output end of the splitter waveguide is recessed from the media-facing surface to reduce an amount of the light exiting from the output end from being reflected from a recording medium back to the light source during operation of the slider.

19. A test system comprising:
a fixture assembly configured to hold a light source and a slider and move the light source and the slider relative to one another, the slider comprising:
a coupling surface;
a delivery waveguide receiving light from the light source via the coupling surface in a first mode;
a near-field transducer at a media-facing surface away from the coupling surface, the near-field transducer receiving a first part of the light from the delivery waveguide; and
a splitter waveguide separated from the delivery waveguide via a gap, the splitter waveguide coupling a second part of the light from the delivery waveguide and directing the second portion of light out of the media-facing surface and away from the near-field transducer;
a light blocker that rejects stray light from the second portion of light;
a current source configured to energize the light source, the delivery waveguide receiving the light in response to the energization of the light source;
a photodetector that converts the second part of the light exiting the slider via the splitter waveguide into an electrical signal;
a controller that receives the electrical signal and produces a control signal; and
at least one actuator that moves the fixture assembly to align the light source with the slider responsive to the control signal.

20. The test system of claim 19, wherein the slider further comprises a polarization rotator that converts the second portion of light from the first mode to a rotated mode, and where the light blocker comprises a polarization filter that filters second portion of light so that the rotated mode is detected via the photodetector.

21. The test system of claim 19, wherein the light blocker comprises a slider-integrated lens and iris that collects an output of the splitter waveguide.

22. The test system of claim 19, wherein the light blocker comprises the splitter waveguide, wherein the splitter waveguide has an output that is offset sufficiently from the delivery waveguide to reject the stray light without polarization rotation of the second portion of the light and without polarization-filtering of the second portion of light.

* * * * *